United States Patent [19]
Hehl

[11] Patent Number: 5,234,337
[45] Date of Patent: Aug. 10, 1993

[54] INJECTION MOLD AND COUPLING ASSEMBLY FOR USE IN AN INJECTION MOLDING MACHINE

[76] Inventor: Karl Hehl, Arthur-Hehl-Strasse 32, W-7298 Lossburg 1, Fed. Rep. of Germany

[21] Appl. No.: 759,160

[22] Filed: Sep. 13, 1991

[30] Foreign Application Priority Data

Sep. 17, 1990 [DE] Fed. Rep. of Germany ....... 4029431

[51] Int. Cl.$^5$ ............................................. A23P 1/00
[52] U.S. Cl. ..................................... 425/589; 425/595
[58] Field of Search ............... 425/182, 190, 195, 589, 425/595

[56] References Cited

U.S. PATENT DOCUMENTS

| | | | |
|---|---|---|---|
| 3,156,014 | 11/1964 | Wenger | 425/595 |
| 3,540,524 | 11/1970 | Bachelier | 425/595 |
| 4,158,910 | 6/1979 | Hanas et al. | 425/590 |
| 4,710,121 | 12/1987 | Hehl | 425/195 |
| 4,976,602 | 12/1990 | Yamazaki | 425/595 |

Primary Examiner—Bernard Nozick
Attorney, Agent, or Firm—Spencer, Frank & Schneider

[57] ABSTRACT

The coupling means of the assembly comprise machine-side coupling parts, which are movable by means of hydraulic cylinders into coupling engagement with the mold-side coupling parts secured to the sections of the injection mold. As a result, the movable mold section is provided with a coupling for connecting the mold to supply lines for a performance of auxiliary operations in both mold sections and the stationary mold section is provided with a coupling for conducting a fluid for the temperature control of both mold sections. Because the coupling for the temperature control and the coupling for any auxiliary operations to be performed in the injection mold are separated from each other, the expenditure involved in the coupling equipment can be adapted to the current requirements of a potential buyer and nevertheless it is possible to effect a temperature control of the injection mold also when it is outside the clamping region of the injection molding machine.

7 Claims, 5 Drawing Sheets

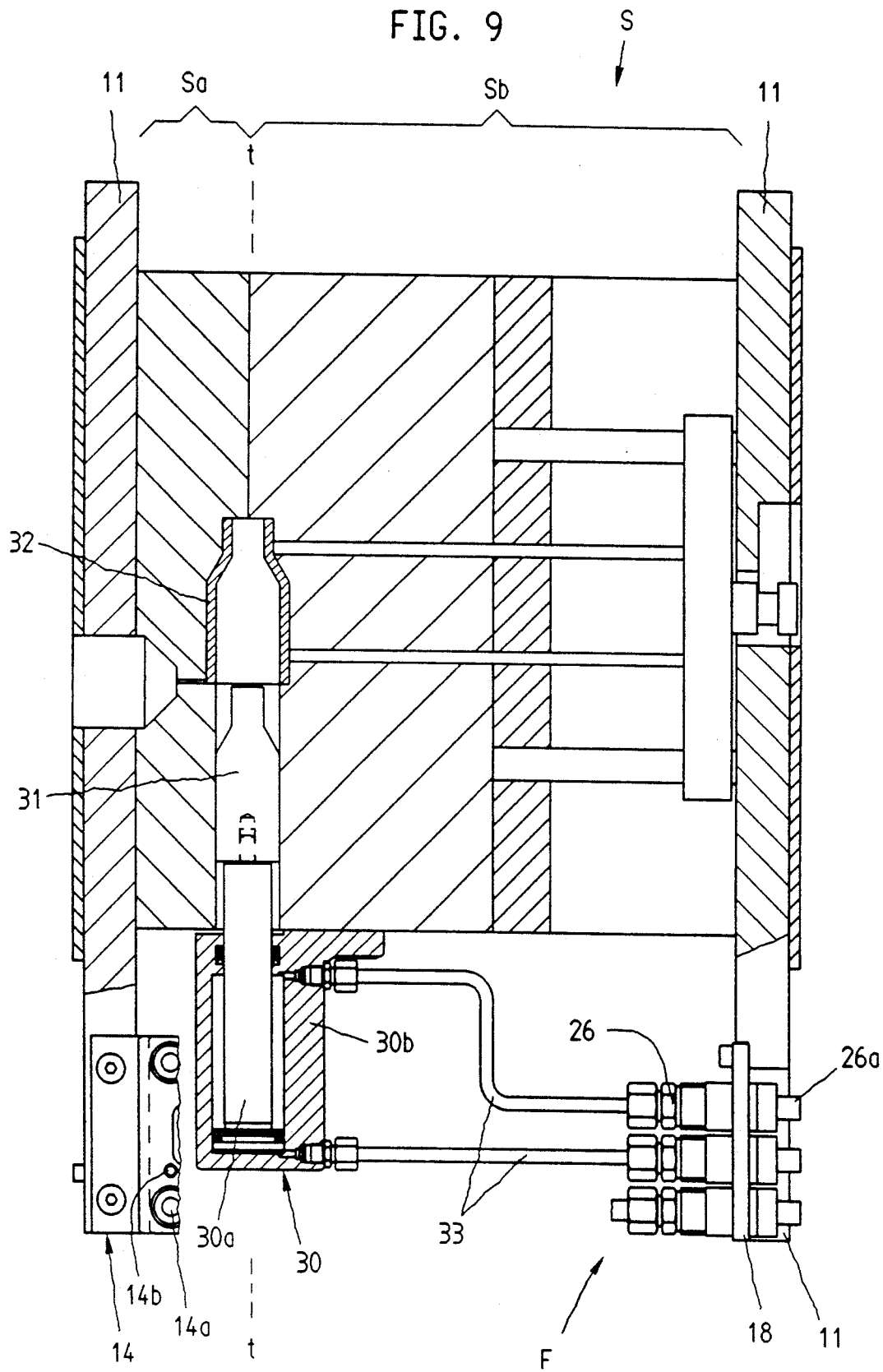

INJECTION MOLD AND COUPLING ASSEMBLY FOR USE IN AN INJECTION MOLDING MACHINE

BACKGROUND OF THE INVENTION

1. Field of the Invention

This invention relates to an assembly which comprises an injection mold of an injection molding machine, which mold comprises back plates, and coupling means for connecting supply lines to said mold for supplying temperature control fluids and for withdrawing such fluids from said mold, and for transmitting electric power and oil underpressure and/or compressed air for the performance of auxiliary operations in the mold, such as the hydraulic pulling of a core from said mold, an ejection of moldings from said mold by means of compressed air, and a delivery of control-signals. Said coupling means comprise a mold-side coupling part, which is secured to the movable mold section of the injection mold, and together with a machine-side coupling part is adapted to constitute a movable coupling for connecting supply lines to said mold, and another mold-side coupling part, which is secured to the stationary mold section of the injection mold and together with another machine-side coupling part is adapted to constitute a stationary coupling for connecting supply lines to said mold. The assembly also comprises hydraulic cylinders, which are operable in dependence on the program of a computer of the injection molding machine to couple each of said machine-side coupling parts to the associated mold-side coupling parts, wherein the closing stroke of the hydraulic cylinder comprises a coupling movement for coupling the machine-side coupling part to the mold-side coupling part.

2. Description of the Prior Art

In the operation of injection molding machines the injection mold must be preheated before the beginning of the molding operation to an optimum temperature for making the molding. That preheating will be described hereinafter as the temperature control of the injection mold and is effected in that a temperature control liquid is pumped through suitable temperature control passages of the body of the injection mold. For an automatic control by which the injection mold is maintained at a desired temperature, which depends on the optimum operating temperature, it is also necessary to supply electric power, e.g., for temperature sensors, to said mold. In most cases the temperature control is effected when the injection mold is in its operative position in the clamping region of the injection molding machine.

Certain auxiliary operations may have to be performed in the injection mold during the molding operation, e.g., when it is desired to make moldings having an intricate shape or moldings formed with internal or external screw threads. In such cases the surfaces defining the mold cavity often comprise surfaces of metal cores, with or without screw threadmolding portions. To permit the removal of the molding from the mold, the cores are pulled or unscrewed from the molding means of motor drives incorporated in the injection mold or by means of electric motors. Other auxiliary operations may also be required to be performed by means of compressed air, e.g., to blow the molding out of the mold. Said auxiliary operations to be performed in the injection mold may depend on a supply of oil under pressure and/or compressed air or of electric power in the form of electric signals for controlling or automatically controlling such auxiliary operating functions.

A known injection mold and coupling means assembly of the kind described hereinbefore is disclosed in DE 3228434 A1 and in the company publication "Netstal News No. 20 February 1986 Netstal-Machinery Ltd. 8752 Nafels, Switzerland. In that known assembly all supply lines are adapted to be coupled to and to be uncoupled from the injection mold when it is in its operative position in the clamping region of the injection molding machine. For that purpose, identical coupling part carriers for both mold sections provided, which carry the coupling parts for the temperature control and the coupling parts for the auxiliary operations. One coupling part carrier is secured to the back plate of the stationary mold section and another, identical coupling carrier is secured to the back plate of the movable mold section. Said mold-side coupling part carriers are associated and aligned with machine-side coupling part carriers, which are also identical to each other. In such an injection mold and coupling means assembly the couplings are substantially symmetrically arranged on the injection mold so that the manufacture is facilitated but the connections of the supply lines for the temperature control, on the one hand, and the connections of the supply lines for the auxiliary operations, on the other hand, cannot be made at spaced apart locations and at different times. Besides, a potential buyer can only decide to purchase the entire coupling means for the temperature control and for all auxiliary operations even when certain auxiliary operations will not be required. Such coupling means must be provided with a hydraulic cylinder for moving the coupling parts into engagement with each other and for locking the coupling parts in their engaged position and requires a large space.

Another known injection mold and coupling means assembly of the kind described first hereinbefore is disclosed in U.S. Pat. No. 4,710,121. In that assembly the supply lines for the temperature control are coupled to and uncoupled from the injection mold when the latter is held on a conditioning table outside the injection molding machine. When a new mold has been temperature controlled and is moved to the clamping region to replace a previously used mold, the coupling connections are maintained as well as during the transfer of a previously used mold from the clamping region of the machine to the conditioning table. The conditioning table is provided with machine-side identical coupling parts (see FIG. 7) which are disposed above the injection mold when it is in position on the conditioning table and said machine-side coupling parts are operatively connected to hydraulic cylinders for actuating said machine-side coupling parts. The machine-side coupling parts are guided during the closing movement of the hydraulic cylinder on vertical coupling pins, which are supported on a bridge provided on the conditioning table. For the movement of the injection mold provided with the supply lines from the conditioning table to the clamping region of the injection molding machine and in the opposite direction it is necessary to provide the machine-side supply lines with flexible and freely movable end sections. Additional couplings (as indicated 36 to 39 in FIGS. 1, 2, 4) are provided for auxiliary operations, said additional couplings, are moved in a closed state by motive power of the injection mold when it is moved from the conditioning table into the clamping region. In such an arrangement it is inherently impossible to ensure that the coupling parts will be closed in a sufficiently concentric position. Besides, the motive power by which the mold is moved from the conditioning table to the clamping region is often not sufficient for effecting a reliable coupling. But the known assembly affords the great advantage that a new injection mold before it is used can be held on a conditioning table and can suitably be temperature-controlled to be at the molding temperature while the molding operation performed by the injection molding machine with the presently installed injection mold, which will subsequently be replaced, is still continued. As the temperature control of a new injection mold may often take more than one hour, the possibility just explained will substantially shorten the downtimes involved in an exchange of the molds.

SUMMARY OF THE INVENTION

It is an object of the invention to provide an injection mold and coupling assembly which is of the kind described first hereinbefore and which is so designed that the coupling parts for the temperature control are operatively connected to first actuating means and comprise a mold-side coupling part, which is mounted on one mold section adjacent to the back plate thereof, and most or all of the coupling means which are optionally provided for any optionally required auxiliary operations are operatively connected to second actuating means and mounted on the other mold section adjacent to the back plate thereof and occupy only a small space so that they can be provided in adaptation to the requirements to be met for given injection molding operations.

It is a further object so to design such an assembly that a temperature control of the mold can be effected when the mold is disposed outside the injection molding machine and nevertheless it is sufficient to couple power supply lines for auxiliary operations to a mold-side coupling part mounted on the other mold section adjacent to its back plate only when said mold is in its operative position in the clamping region and only if such auxiliary operations are required to be performed. It is a further object so to design such an assembly that the coupling means for auxiliary operations, which are spaced apart from the coupling means for the temperature control, are adapted to couple eliable by a single hydraulic cylinder requiring little space.

Said objects are accomplished in accordance with the invention in that one of said couplings is operable to selectively couple said mold to power supply lines required for the performance of said auxiliary operations, the other of said couplings is adapted to selectively couple said mold to fluid supply lines for the temperature control of both said mold sections, and the machine-side coupling part of each of said couplings is operatively connected to the associated one of said hydraulic cylinders by means for converting the closing stroke of said cylinder into a coupling movement in a first direction for coupling the associated machine-side coupling part to the associated mold-side coupling part and into a clamping movement in a direction which is contrary to said first direction, by which movement a carrier element carrying said hydraulic cylinder is forced against the adjacent mold section.

In such an assembly the advantage afforded in the assembly known from U.S. Pat. No. 4,710,121 and residing in that the downtime involved in an exchange of the injection mold is shortened because the mold is temperature controlled while it is outside the clamping region will fully be preserved but a large number of power supply lines required for a performance of auxiliary operations need not be connected to the mold when it is outside the clamping region. As has been discussed hereinbefore in the first paragraph of the description of the prior art it is necessary in the arrangement just discussed that certain auxiliary operations are performed also in connection with the temperature control of the injection mold while it is arranged on the conditioning table and such auxiliary functions may particularly include operations required for an automatic control of the temperature of the mold at a set point. But most or all of the power supply lines required for the performance of auxiliary operations in the mold will not be connected to the mold until it is disposed in the clamping region of the injection molding machine so that the coupling of said power supply lines is effected at a different time and at a different location from the coupling of the fluid supply lines for the temperature control. Such a separation of the coupling means for the temperature control from the coupling means for most or all of the power supply lines required for performing the auxiliary operations affords the advantage that only fluid supply lines for the temperature control must extend from the sources of supply associated with the injection molding machine as far as to the conditioning table but it will be sufficient for power supply lines for the performance of auxiliary operations to extend only along a short distance to the clamping region. For this reason it will also be possible to use smaller coupling means which are to be coupled when the mold is disposed on the conditioning table because such coupling means need not be connected to power supply lines required for the performance of auxiliary operations. The fact that said coupling means are smaller in size and used to connect a smaller number of supply lines will facilitate the transfer of the injection mold between the conditioning table and the clamping region. If the injection mold is supplied with power in accordance with the concept which has just been outlined, a given injection molding machine which is delivered to the operator may be provided with coupling means for connecting a larger or smaller number of supply lines to the mold so that the operator may restrict his expenditure involved in the injection molding machine to the financial resources which are then at his disposal and to his current automation requirements. In case further requirements arise in the future, they can be met by a procuring of additional coupling means. Besides, the coupling means can be accommodated within a relatively small space and it is sufficient to provide for each coupling a single actuating means for performing the coupling movement and the clamping movement. This is important, because the space about the mold in many cases is required by auxiliary assemblies par example assemblies for taking off molded parts from the mold opened.

FIG. 9 is an enlarged sectional top plan view of one part of the structure shown in FIG. 2, illustrating further details.

DETAILED DESCRIPTION OF THE PREFERRED EMBODIMENT

Figure 1:
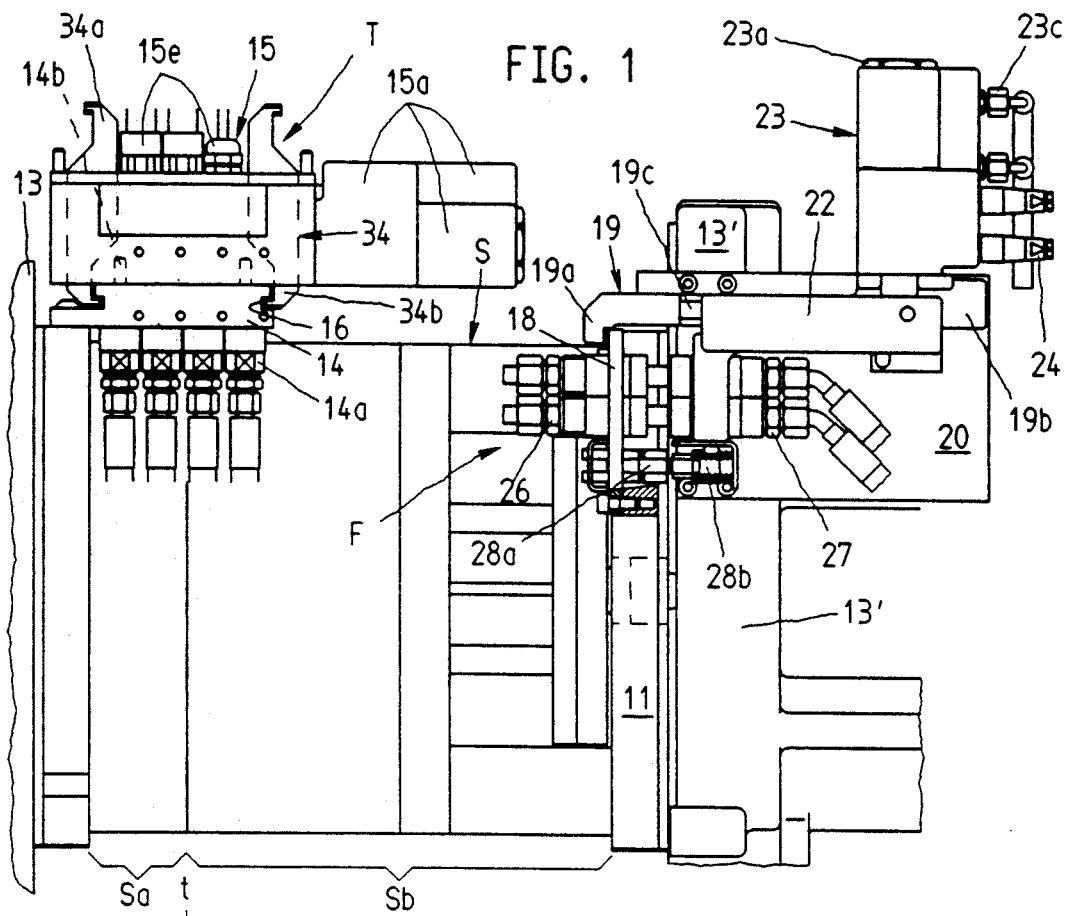
FIG. 1 is a rear elevational view of a preferred embodiment of an injection mold and coupling assembly in an injection molding machine.

An illustrative embodiment of the invention will now be described more in detail with reference to the drawing.

Figure 2:
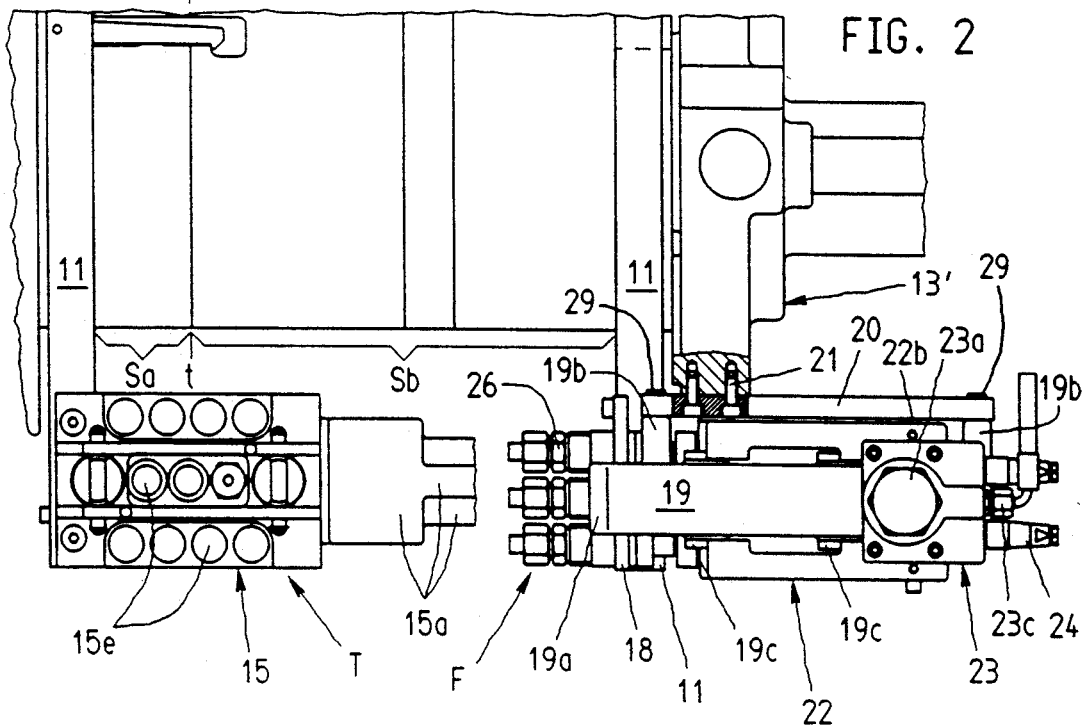
FIG. 2 is a top plan view of the structure shown in FIG. 1.

In accordance with FIGS. 1, 2, and 9, an injection mold S comprises a stationary mold section (mold half) Sa and a movable mold section (mold half) Sb, each of which is provided with a block plate 11 and by means of said back plate 11 is adapted to be detachably fixed to an associated mold carrier 13 or 13' of the clamping unit of an injection molding machine. The terms "stationary" and "movable" used in connection with the mold sections Sa and Sb and the mold carriers 13 and 13' relate to the behavior of said mold sections and mold carriers during the molding operation performed while the mold S is in an operative position in the clamping region of the machine. Said behavior refers to the opening and closing the mold. But the two mold sections Sa and Sb are jointly movable between said clamping region and a conditioning table outside the machine.

Coupling means are provided for connecting the mold S to supply lines for a fluid for effecting a temperature control of the mold and to power supply lines for a supply of power for a performance of auxiliary operations in the mold S. The power supply lines and the fluid supply lines may be collectively referred to as energy supply lines. Such auxiliary operations may comprise a hydraulic pulling of cores, an ejection of moldings by means of compressed air, and a transmission of control-signals. The stationary mold section Sa is provided with a first mold-side coupling part 14, which is adapted to be coupled to a first machine-side coupling part 15 to constitute a stationary coupling T for supply lines for a fluid for a temperature control of the injection mold. The movable mold section Sb is provided with a second mold-side coupling part 26, 28a, which is adapted to be coupled to a second machine-side coupling part 27, 28b to constitute a movable coupling F for connecting power supply lines to the mold S. The first mold-side coupling part comprises a hydraulic upper coupling element 27 and an electrical lower coupling element 28b. Two hydraulic cylinders 23 are provided for actuating the movable coupling F and the stationary coupling T by a closing stroke so that the machine-side coupling parts 27, 28b; and 15 can be coupled to and uncoupled from the mold-side coupling parts 26, 28a; 14. The hydraulic cylinders 23 thus form a coupling and uncoupling power mechanism. The coupling T connected to the stationary mold section Sa connects the mold S to the supply lines for the temperature control of the mold S. The coupling F connected to the movable mold section Sb connects the mold S to most or all of the power supply lines required for auxiliary operations in the mold S. In FIGS. 1 to 8 the injection mold S is shown in its operative position in the clamping region of the injection molding machine. The mold S has been transferred to said clamping region from a conditioning table. For effecting a temperature control of the mold S, the stationary coupling T is in a closed state while the mold S is disposed on the conditioning table and remains in said closed stat during the transfer of the mold S to the clamping region and while the mold S is operated in the clamping region to perform a molding operation.

The stationary coupling T which is associated with the stationary mold section Sa is opened and closed by a coupling movement in a direction which is parallel to the parting plane t—t of the injection mold S. The movable coupling F which is associated with the movable mold section Sb is opened and closed by a coupling movement which is at right angles to the parting plane t—t. As is particularly apparent from FIGS. 2 and 9 the back plates 11 protrude rearwardly from the body of the mold S. Each of the mold-side coupling parts 14 and 26 is provided adjacent to that portion of the associated back plate 11 which protrudes from the body of the mold. One mold-side coupling part 14 is secured to the top edge of the back plate 11 of the stationary mold section Sa. The other mold-side coupling part 26 is secured to a mounting plate 18, which is fastened to the back plate 11. As is particularly apparent from FIG. 2 the mounting plate 18 extends partly into a mating recess formed in the back plate 11. The direction of the stroke of each of the hydraulic cylinders 23 and 15a of the assembly is at right angles to the direction of the coupling and uncoupling movements of that machine-side coupling part which is actuated by said cylinder. The force vector of the closing stroke of each of said cylinders is deflected through 90° by suitable cam plates 25, which are formed with oblique cam slots 25a. Each cam plate 25 which thus forms a force-transmitting mechanism, is connected to the piston rod 23e of the hydraulic cylinder 23 by a pivot 23h. The force vector or the stroke of the cylinder 23 is deflected by the cooperation of the cam follower pins 22b and the oblique cam slots 25a of the cam plates 25. The cam follower pins 22b are mounted on a carriage 22, which carries the machine-side coupling parts 27, 28b. The carriage 22 together with the associated machine-side coupling parts 27 or 28b and a carrier 19 carrying the hydraulic cylinder 23 constitutes a subassembly, which is mounted for a limited horizontal displacement in a vertical bearing plate 20, which is secured to the movable mold carrier 13' by means of screws 21 when the injection mold S is in operative position in the clamping region of the machine.

Said unit is shown in FIGS. 1 to 5 before it is secured to the fitting plate 18 when the coupling F has not yet been closed.

Figure 3:
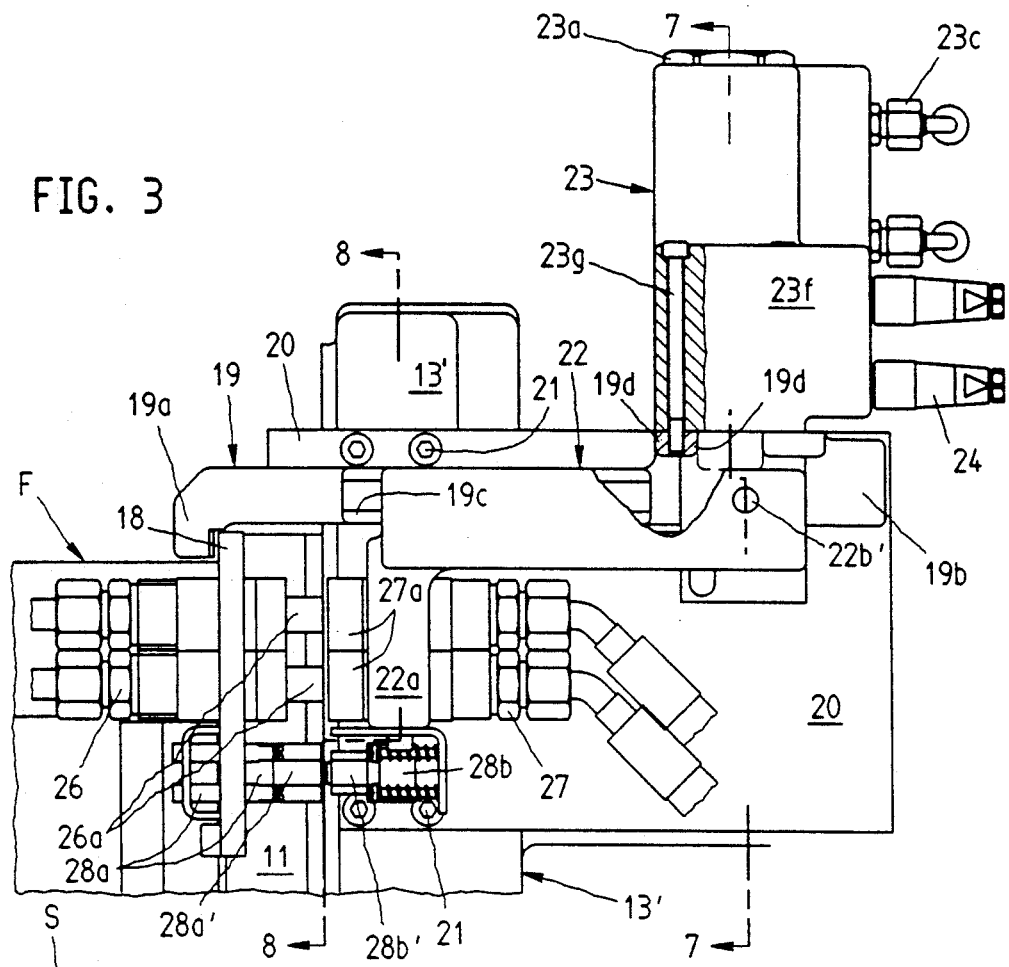
FIG. 3 is an enlarged view of one part of rear elevational FIG. 1, showing further details.
Figure 4:
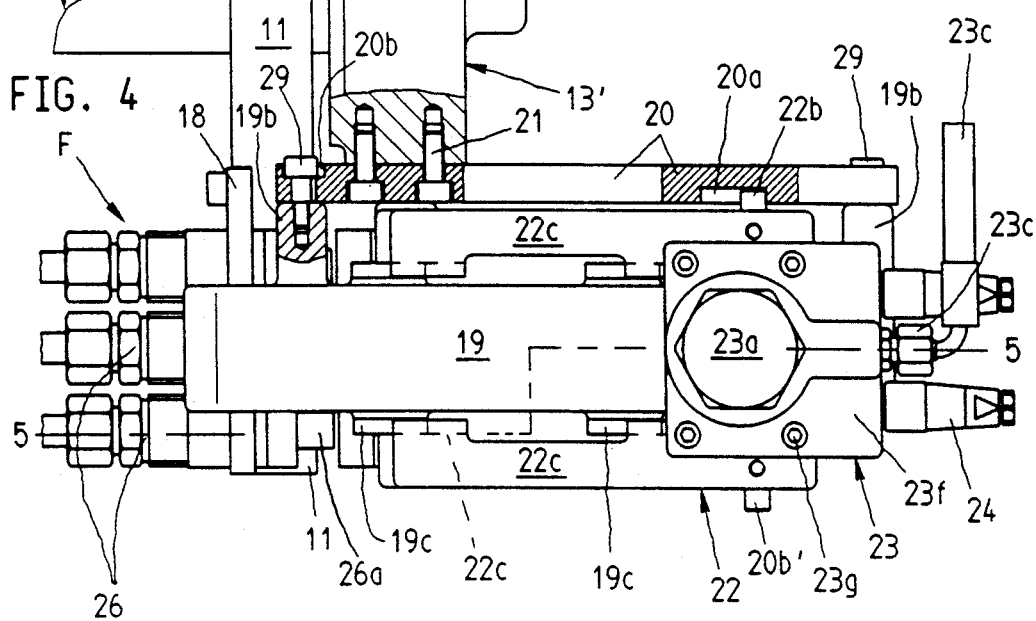
FIG. 4 is an enlarged view of one part of top plan FIG. 2, showing further details.

As is particularly apparent from FIGS. 3 to 6, the carriage 22 comprises a vertical carrier plate 22a, which faces the mold S and to which the machine-side coupling parts 27, 28b are secured. The carriage 22 also comprises two horizontal legs 22c, which extend rearwardly from the carrier plate 22a. The carriage 22 is horizontally slidably mounted on guide ribs 19c of a cylinder carrier 19, on which the hydraulic cylinder 23 is mounted. The hydraulic cylinder 23 comprises a cylinder block 23f, which is connected by screw fasteners 23g to mounting sockets 19d of the cylinder carrier 19 (FIG. 3). The piston 23d of the hydraulic cylinder 23 defines cylinder chambers 23b, which are connected to hydraulic ports 23c for supplying and withdrawing a hydraulic fluid to and from the chambers 23b. The rear cylinder chamber is closed by a cylinder cover 23a. Limit switches 24 serve to control the operation of the hydraulic cylinder 23. As is particularly apparent from FIG. 4 the elongate cylinder carrier 19 is provided with lateral projections 19b and by said projections 19b and associated screws 29 is supported on the bearing plate 20. As will be explained hereinafter the screws 29 serve as limiting means. The force exerted by the piston rod 23e during the inward movement of the piston 23d, that is, during the closing stroke of the hydraulic cylinder 23 disposed adjacent to the movable mold carrier 13' is used to effect a coupling movement, by which the machine-side coupling part 27, 28b is moved into engagement with the mold-side coupling part 26, 28a, and into a clamping movement, by which the carrier 19, which carries the hydraulic cylinder 23, is forced against the movable mold section Sb. The coupling movement is executed by the carriage 22 in a first direction (leftward in FIG. 5) and the clamping movement is performed by the carrier 19 in a second direction (rightward in FIG.5). The coupling movement is limited in that a cam follower pin 22b of the carriage 22 engages one end of a limiting groove 20a formed in the bearing plate 22. The cam follower pin 22b extends from the carriage 22 through the cam slot 25a of the adjacent cam plate 25 and into the limiting groove 20a. The clamping movement is limited by limiting recesses 20b (FIG. 4) formed in the bearing plate 20. Screws 29 mounted in the carrier extend into the limiting recesses 20b with a lost motion, by which the clamping movement is determined.

During the last portion of the closing movement the coupling elements 27a, 28b' (FIG. 3) of the machine-side coupling parts 27, 28b which are being actuated are coupled to the coupling elements 26a, 28a' (FIGS. 3, 5) of the mold-side coupling parts 26, 28a.

Figure 5:
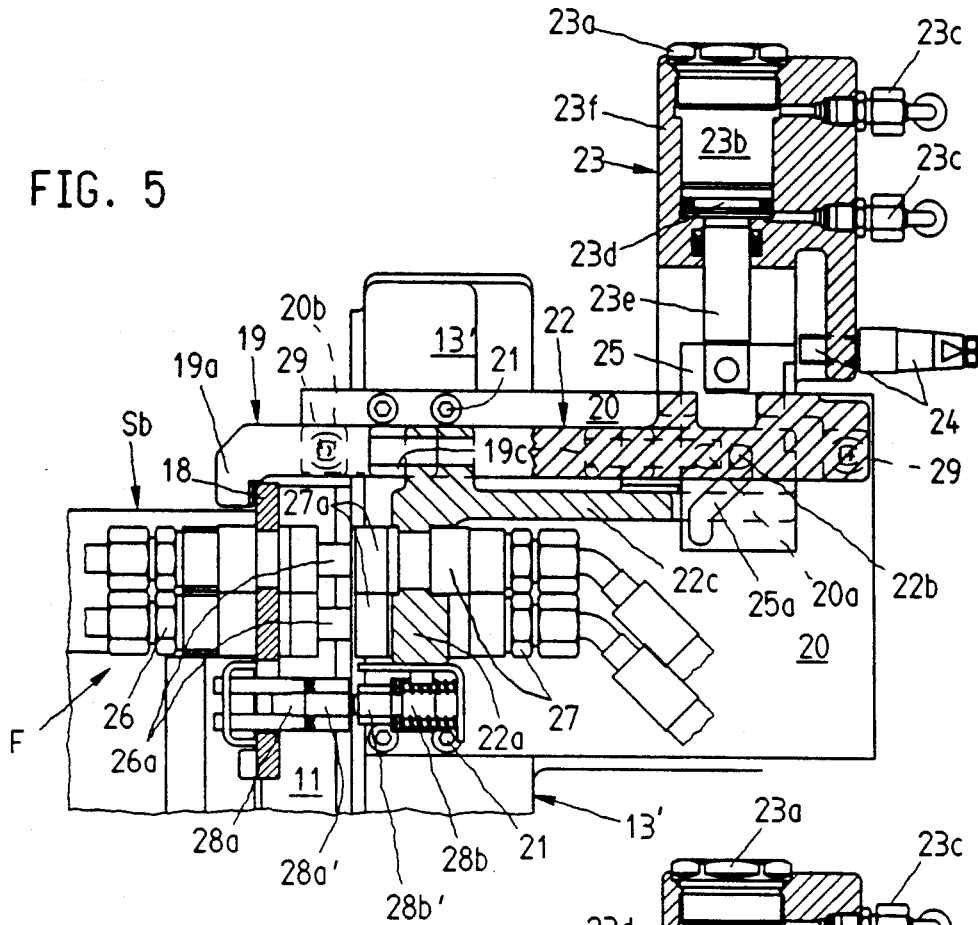
FIG. 5 is a sectional view taken along line 5—5 of FIG. 4, illustrating the mold-side coupling parts and the associated machine-side coupling parts in an uncoupled state.
Figure 6:
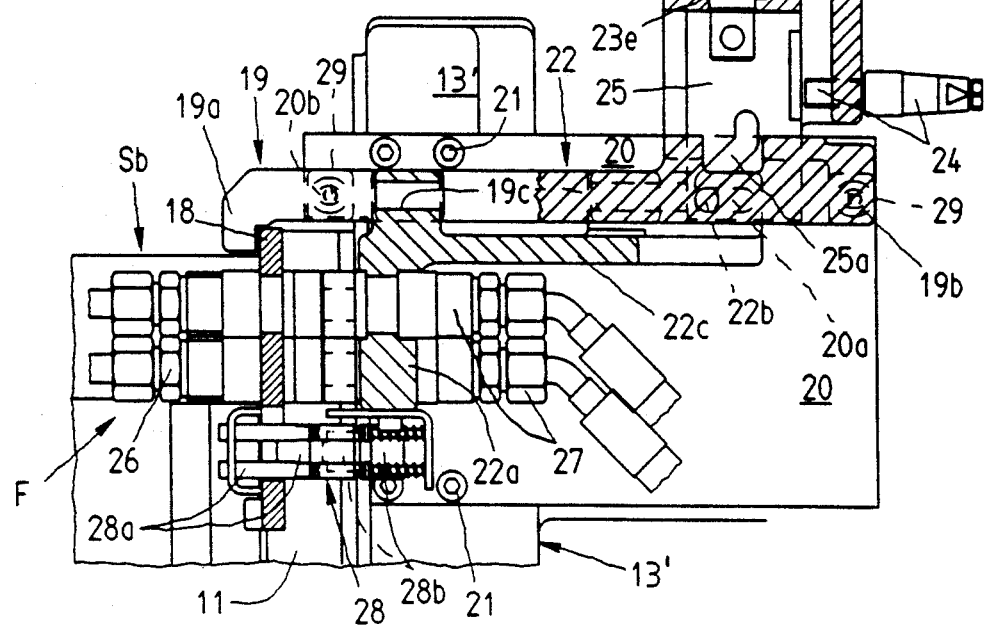
FIG. 6 is a view similar to FIG. 5, illustrating the mold-side coupling parts and the associated machine-side coupling parts in a coupled state.
Figure 7:
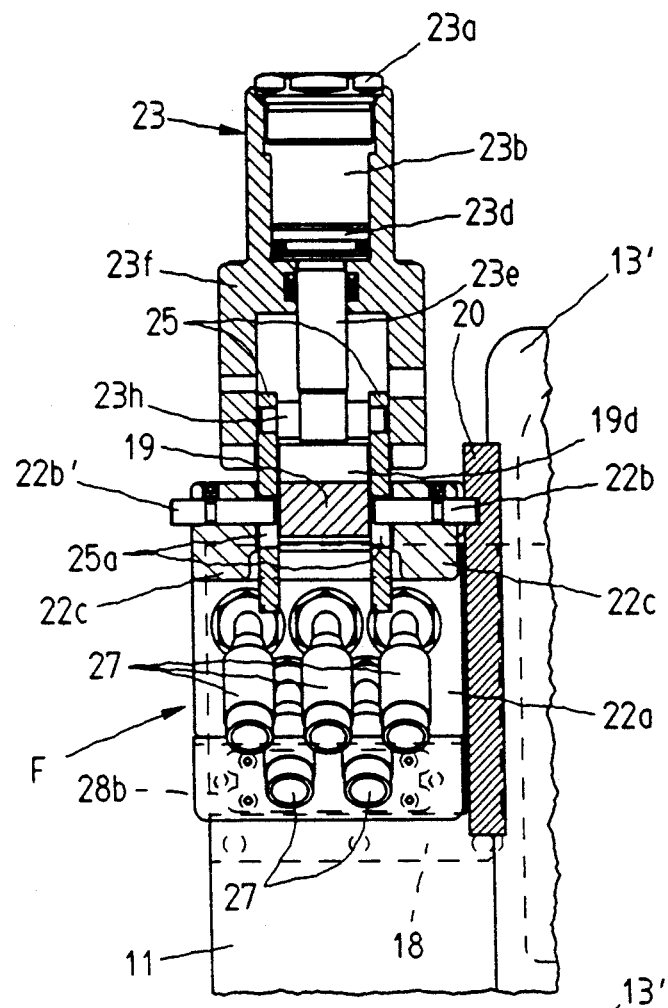
FIG. 7 is a sectional view taken along line 7—7 of FIG. 3.
Figure 8:
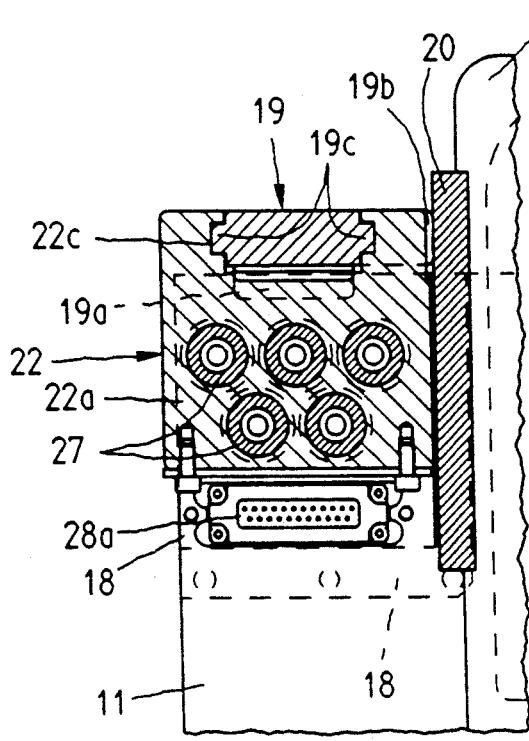
FIG. 8 is a sectional view taken along line 8—8 of FIG. 3.

During the closing stroke of the hydraulic cylinder 23 the carriage 22 carrying the coupling part 27, 28b and the carrier 19, which is provided with a clamping part, such as a locking nose 19a, are moved, perpendicularly to the parting plane t—t, from the position shown in FIG. 5 to the position shown in FIG. 6 so that the carrier 19 performs the small lost motion to the right, which is permitted by the screws 29 in the limiting recess 20b, and the locking nose 19a is thus caused to engage the forward face of the mounting plate 18. The vertical positioned mounting plate 18 fastened on the back plate is of a standardized size even if the actual molds are of different size. In dependence on the length of the limiting groove 20a (FIG. 4) the carriage 22 moves to the left until the cam follower pin 22b engages the left-hand edge of the limiting groove 20a. The mutually opposite directions of the movements of the carrier 19 and the carriage 22 are due to the fact that a vertical movement of the cam follower pin 22b in the cam slot 25a imparts to the carriage a horizontal movement to the left and imparts to the cylinder carrier 19 a horizontal movement to the right. Said horizontal movements constitute the coupling movement and the clamping movement, respectively. Thus, the force of the piston rod 23e, originally oriented parallel to the stroke of the piston rod 23e, is converted into two oppositely-oriented displacement forces that are transverse to the original stroke force of the piston rod 23e.

Because the hydraulic cylinder 23 is fixedly mounted on the cylinder carrier 19 so that the latter constitutes an abutment for the cylinder 23, the closing stroke of the hydraulic cylinder 23 will impart the horizontal movement to the cylinder carrier 19 to the extent determined by the lost motion of the screws 29 in the limiting recesses 20b. For the protection of the electrical lower coupling elements 28a, 28b of the movable coupling F the machine-side coupling part 28b is buffered at its rear by coil springs.

In an injection mold and coupling assembly having such a design the subassembly which comprises the machine-side coupling part 27, 28b; the carriage 22 carrying said coupling part, the associated hydraulic cylinder 23 and the cylinder carrier 19 carrying said cylinder is supported by the bearing plate 20 on the movable mold carrier 13' for a limited sliding movement and when the coupling has been closed is firmly clamped against the back plate 11 of the movable mold section in a position in which the nose 19a of the cylinder carrier 19 engages the back plate 11 on one side thereof and the carrier 22a included in the carriage 22 and carrying the coupling part 27, 28b engages the back plate 11 on the other side thereof. This means that for said clamping and coupling movements the closing stroke of the hydraulic cylinder 23 must be converted to mutually opposite movements of the cylinder carrier 19 and of the carriage 22. In dependence on the initial position the clamping movement of the cylinder carrier 19 may be relatively small and the clamping movement of the carriage 20 may be correspondingly large or vice versa. In dependence on the frictions involved in said clamping movements they may take place at the same time or in succession.

FIG. 9 illustrates the supply of a pressure fluid through the mold-side coupling part 26 and connecting lines 33 to a hydraulic cylinder 30 for actuating a metal core 31 in the mold S. The hydraulic cylinder 30 comprises a cylinder body 30b and a piston rod 30a and has a horizontal axis extending in the parting plane t—t of the mold S. In the position shown in FIG. 9 the core 31 has been pulled out of the molding 32.

In accordance with FIGS. 1 and 2 the stationary coupling T comprises the machine-side coupling part 15 provided with ports 15e for connection to the supply lines for the temperature control and the mold-side coupling part 14 provided with ports 14a connected to the mold S by supply lines for the temperature control. For closing and opening the stationary coupling T, the machine-side coupling part 15 is vertically guided on guide pins 34, which are adapted to be supported on a bridge provided on the conditioning table by upper locking members 34a and on the mold-side coupling part 14 by lower locking members 34b, which extend into a guide groove 16 of the mold-side coupling part 14. The means for deflecting the force vector of the closing stroke of the hydraulic cylinder 15a for closing and opening the stationary coupling T are similar to the means for deflecting the force vector of the hydraulic cylinder 23 for closing and opening the movable coupling F.

It will be understood that the term "supply line" when used herein for lines for conducting a fluid is applicable to lines for supplying such fluid to said mold and to lines for withdrawing such fluid from said mold.

I claim:

1. In an injection molding machine including
   a stationary mold carrier;
   a movable mold carrier shiftable toward and away from the stationary mold carrier during molding operation;
   a stationary mold half carried by said stationary mold carrier;
   a movable mold half carried by said movable mold carrier for shifting said movable mold half into engagement with said stationary mold half for obtaining a closed mold formed by the two mold halves engaging one another along a mold parting plane;
   a machine-side coupling part mounted on said movable mold carrier; said machine-side coupling part being connected with lines for supplying energy to the movable mold half;
   a mold-side coupling part mounted on said movable mold half; said machine-side coupling part and said mold-side coupling part together forming a coupling assembly; and
   a coupling and uncoupling power means for moving said machine-side coupling part and said mold-side coupling part into and out of engagement with one another in a coupling and, respectively, in an uncoupling movement to establish and, respectively, to interrupt communication between said lines on the one hand and said movable mold half on the other hand;
   the improvement wherein said coupling and uncoupling power means comprises
   (a) a cylinder carrier supported on said movable mold carrier for displacement relative to said movable mold carrier in a direction perpendicular to said parting plane; said cylinder carrier having a clamping part;
   (b) a power cylinder having a movable part executing a stroke generating a force in a stroke direction; said power cylinder being mounted on said cylinder carrier for movement with said cylinder carrier as a unit;
   (c) a carriage supported on said movable mold carrier for displacement relative to said movable mold carrier and said cylinder carrier in a direction perpendicular to said parting plane; said machine-side coupling part being mounted on said carriage for movement as a unit therewith; and
   (d) force-transmitting means for transmitting said force to said carriage for moving said carriage and said machine-side coupling part in a first direction into a coupling engagement with said mold-side coupling part and for transmitting said force to said cylinder carrier for moving said cylinder carrier in a second direction into a clamping engagement between said clamping part of said cylinder carrier and said movable mold half; said first direction being opposite to said second direction.

2. The injection molding machine as defined in claim 1, wherein said movable mold half has a back plate and a mounting plate secured to said back plate; said mold-side coupling part being mounted in said mounting plate; in said clamping engagement said cylinder carrier clamping said mounting plate and said back plate with said clamping part against said movable mold carrier.

3. The injection molding machine as defined in claim 1, wherein said clamping part includes a locking nose; said locking nose being in said clamping engagement with said mounting plate of said movable mold half.

4. The injection molding machine as defined in claim 1, wherein said force-transmitting means comprises
   (a) a cam plate mounted on said movable part of said power cylinder for displacement therewith;
   (b) a cam slot provided in said cam plate and extending obliquely to said stroke direction of said of said power cylinder; and
   (c) a cam follower pin affixed to said carriage and extending into said cam slot.

5. The injection molding machine as defined in claim 4, wherein said power cylinder comprises a hydraulic cylinder; said movable part of said power cylinder comprising a piston slidably accommodated in said hydraulic cylinder and a piston rod attached to said piston; said cam plate being secured to said piston rod.

6. The injection molding machine as defined in claim 4, wherein said first and said second directions are oriented at right angles to said stroke direction.

7. The injection molding machine as defined in claim 4, further comprising
   (a) a bearing plate affixed to said movable mold carrier;
   (b) a motion limiting groove provided in said bearing plate and slidably receiving said follower pin for guiding said carriage in a motion perpendicular to said parting plane;
   (c) a motion limiting recess provided in said carriage; and
   (d) a motion limiting pin affixed to said cylinder carrier and slidably received in said motion limiting recess for guiding said cylinder carrier in a motion relative to said carriage in a direction perpendicular to said parting plane.

* * * * *